(12) United States Patent
Zhu et al.

(10) Patent No.: US 8,391,933 B2
(45) Date of Patent: *Mar. 5, 2013

(54) PORTABLE AUDIO DEVICE HAVING REDUCED SENSITIVITY TO RF INTERFERENCE AND RELATED METHODS

(75) Inventors: Lizhong Zhu, Waterloo (CA); Michael Corrigan, Waterloo (CA); George Mankaruse, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,603

(22) Filed: Mar. 28, 2011

(65) Prior Publication Data

US 2011/0170708 A1    Jul. 14, 2011

Related U.S. Application Data

(63) Continuation of application No. 12/574,194, filed on Oct. 6, 2009, now Pat. No. 7,925,315, which is a continuation of application No. 11/343,090, filed on Jan. 30, 2006, now Pat. No. 7,616,973.

(51) Int. Cl.
*H04M 1/00* (2006.01)
(52) U.S. Cl. ............. 455/575.1; 455/63.1; 455/67.13; 455/575.5; 455/569.1; 455/566; 455/296; 455/300; 379/167.15; 439/73; 439/76.1; 439/78; 709/219
(58) Field of Classification Search .............. 455/575.1, 455/63.1, 67.13, 569.1, 296, 300, 570; 709/219
See application file for complete search history.

(56) References Cited

U.S. PATENT DOCUMENTS

| | | | |
|---|---|---|---|
| 5,596,638 A | 1/1997 | Paterson et al. | 455/575.2 |
| 5,903,825 A * | 5/1999 | Goode et al. | 455/205 |
| 5,963,588 A | 10/1999 | Yatim et al. | 375/222 |
| 5,978,689 A | 11/1999 | Tuoriniemi et al. | 455/569.1 |
| 6,035,212 A | 3/2000 | Rostoker et al. | 455/552.1 |
| 6,108,415 A | 8/2000 | Andrea | 379/433.03 |
| 6,212,555 B1 * | 4/2001 | Brooks et al. | 709/219 |
| 6,307,944 B1 | 10/2001 | Garratt et al. | 381/312 |
| 6,330,247 B1 * | 12/2001 | Chang et al. | 370/442 |
| 6,647,367 B2 * | 11/2003 | McArthur et al. | 704/226 |
| 6,961,561 B2 | 11/2005 | Himmel et al. | 455/419 |
| 7,035,588 B2 | 4/2006 | Sim et al. | 455/41.2 |
| 7,072,476 B2 | 7/2006 | White et al. | 381/74 |
| 7,243,851 B2 | 7/2007 | Zhu et al. | 235/472.02 |
| 7,266,390 B2 * | 9/2007 | Mathews | 455/556.1 |
| 7,302,234 B1 | 11/2007 | Fessler et al. | 455/67.13 |
| 7,328,047 B2 | 2/2008 | Zhu et al. | 455/556 |
| 7,330,737 B2 | 2/2008 | Mahini | 455/557 |
| 7,353,041 B2 | 4/2008 | Zhu et al. | 455/550 |
| 7,363,063 B2 | 4/2008 | Zhu et al. | 455/575.1 |
| 7,369,868 B2 * | 5/2008 | Dunko et al. | 455/517 |

(Continued)

*Primary Examiner* — Marceau Milord
(74) *Attorney, Agent, or Firm* — Allen, Dyer, Doppelt, Milbrath & Gilchrist, P.C.

(57) ABSTRACT

A portable audio device having reduced sensitivity to RF interference over a predetermined frequency range from an adjacent mobile wireless communications device may include a portable housing, a battery carried thereby, a recharging power input connected to the battery, a digital signal input, and an audio analog signal output. A digital-to-analog converter (DAC) may be carried by the portable housing and powered by the battery for converting a selected digital audio file from a memory into an analog audio signal. An audio analog amplifier may be connected between the DAC and the audio analog signal output. A first RF filter(s) may be connected to the recharging power input, and a second RF filter(s) may be connected to the audio analog signal output, both for reducing RF interference over the predetermined frequency range from the adjacent mobile wireless communications device.

20 Claims, 6 Drawing Sheets

U.S. PATENT DOCUMENTS

| | | |
|---|---|---|
| 7,398,072 B2 | 7/2008 | Corrigan et al. ............... 455/301 |
| 7,444,174 B2 | 10/2008 | Zhu et al. ................... 455/575.1 |
| 7,480,523 B2 | 1/2009 | Zhu et al. ................... 455/575.1 |
| 7,515,944 B2 | 4/2009 | Zhu et al. ................... 455/569.1 |
| 7,573,943 B2 | 8/2009 | Cioffi ............................ 375/260 |
| 7,577,455 B2 | 8/2009 | Szymanski et al. ........... 455/519 |
| 7,616,973 B2 * | 11/2009 | Zhu et al. ................... 455/575.1 |
| 7,925,315 B2 * | 4/2011 | Zhu et al. ................... 455/575.1 |
| 2002/0123308 A1 * | 9/2002 | Feltstrom ........................ 455/63 |
| 2002/0151329 A1 * | 10/2002 | Prince et al. ................... 455/557 |
| 2003/0059071 A1 | 3/2003 | Dunham ....................... 381/309 |
| 2005/0090295 A1 * | 4/2005 | Ali et al. .................... 455/575.2 |
| 2005/0156568 A1 * | 7/2005 | Yueh ............................. 320/128 |
| 2006/0172780 A1 | 8/2006 | Krippgans ..................... 370/466 |

* cited by examiner

PORTABLE AUDIO DEVICE HAVING REDUCED SENSITIVITY TO RF INTERFERENCE AND RELATED METHODS

Field of the Invention

This application is a continuation of Ser. No.12/574,194 filed Oct. 6, 2009 now U.S. Pat. No. 7,925,315, issued Apr. 12, 2011, which, in turn, is a continuation of pending Ser. No. 11/343,090 filed Jan. 30, 2006 now U.S. Pat. No. 7,616,973 issued Nov. 10, 2009, all of which are hereby incorporated herein in their entireties by reference.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to uses. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Accordingly, because of the widespread use and reliance on cellular devices, many users carry their cellular devices on their person much of the day. Yet, since cellular devices are frequently communicating with a cellular network even when a user is not participating in a phone call, they are frequently emitting radio frequency (RF) signals. When in close proximity to other electronic equipment, such as personal audio devices (e.g., portable radios, MP3 players, etc.), these RF signals may cause interference which results in an audible buzz or other undesirable sound from the personal audio device.

One exemplary portable audio device is disclosed in U.S. patent application publication no. 2003/0059071. This application is directed to an integrated personal audio device that provides hearing protection for a user. The device includes a flexible band configured to extend at least partially around a head of a user. An audio transmitter is coupled to the band. The band has two legs that terminate at respective end portions. Each end portion is coupled to an audio speaker, which is electrically, connected to the audio transmitter. A hearing protector is mounted onto each respective audio speaker. Moreover, the audio transmitter may include RF shielding to filter radio interference associated with nearby electric equipment, for example.

While such devices may provide some reduction in unwanted RF interference, further RF interference protection may be required to significantly mitigate the effects of RF interference from a nearby cellular device, for example.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation are used to indicate similar elements in alternate embodiments.

Generally speaking, a portable audio device is disclosed herein having reduced sensitivity to RF interference over a predetermined frequency range from an adjacent mobile wireless communications device. The portable audio device may include a portable housing, a battery carried by the portable housing, a recharging power input connected to the battery, a digital signal input, and an audio analog signal output. The portable audio device may further include a memory carried by the portable housing and powered by the battery for storing digital audio files input thereto via the digital signal input. In addition, a digital-to-analog converter (DAC) may be carried by the portable housing and powered by the battery for converting a selected digital audio file from the memory into an analog audio signal. Moreover, an audio analog amplifier may be connected between the DAC and the audio analog signal output. At least one first RF filter may be connected to the recharging power input for reducing RF interference over the predetermined frequency range from the adjacent mobile wireless communications device. Additionally, at least one second RF filter may be connected to the audio analog signal output for reducing RF interference over the predetermined frequency range from the adjacent mobile wireless communications device.

More particularly, the portable audio device may further include at least one third RF filter connected to the digital signal input for reducing RF interference over the predetermined frequency range from the adjacent mobile wireless communications device. By way of example, the at least one third RF filter may be a parallel connected capacitor. The portable audio device may also include an audio analog input connected to the audio analog amplifier, and at least one fourth RF filter connected to the audio analog signal input for reducing RF interference over the predetermined frequency range from the adjacent mobile wireless communications device. The at least one fourth RF filter may include a series connected inductor and a parallel connected capacitor, for example.

By way of example, the at least one first RF filter may include a parallel connected capacitor, and the at least one second RF filter may include a series connected inductor and parallel connected capacitor. In addition, the predetermined frequency range may be from about 30 MHz to 6 GHz, for example. Also, the stored digital audio files may be digital stereo audio files, MP3 files, etc. Moreover, the portable audio device may further include at least one display carried by the portable housing, and at least one user input device carried by the portable housing.

A related method aspect is for reducing sensitivity of a portable audio device, such as the one described briefly above, to RF interference over a predetermined frequency range from an adjacent mobile wireless communications device. The method may include connecting at least one first RF filter to the recharging power input for reducing RF interference over the predetermined frequency range from the adjacent mobile wireless communications device, and connecting at least one second RF filter to the audio analog signal output for reducing RF interference over the predetermined frequency range from the adjacent mobile wireless communications device.

Figure 1:
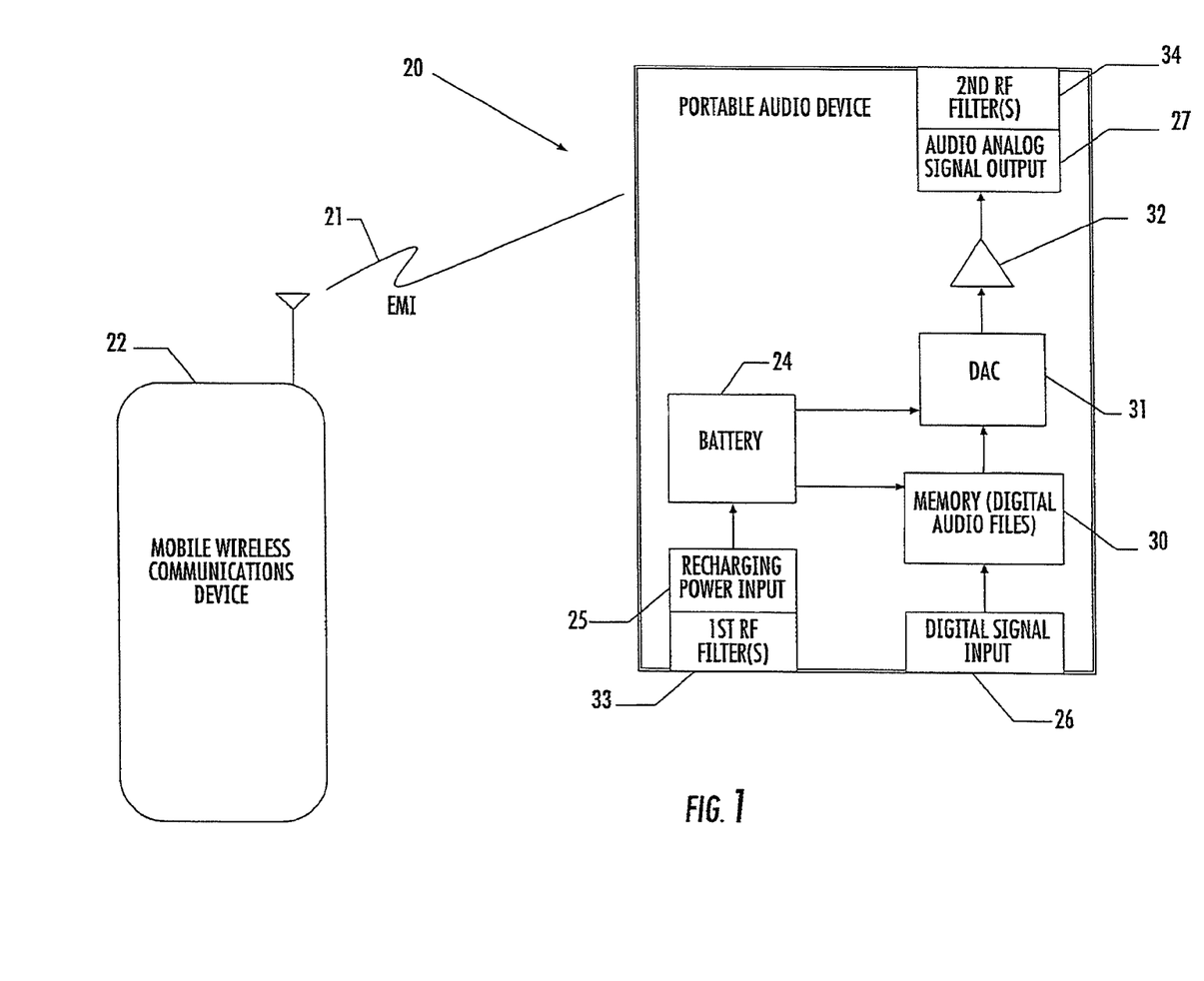
FIG. 1 is a schematic block diagram of a portable audio device having reduced sensitivity to RF interference from an adjacent mobile wireless communications device according to the invention.

Referring initially to FIG. 1, a portable audio device 20 advantageously has reduced sensitivity to RF interference over a predetermined frequency range from RF electromagnetic (EM) energy 21 from an adjacent mobile wireless communications device 22. In particular, the RF signals transmitted by the mobile wireless communications device 22 are within one or more predetermined frequency ranges or bands, as will be appreciated by those skilled in the art. These transmissions can cause interference at the portable audio device 20 that results in undesirable audible noises, such as buzzing, for example. As will be described further below, the portable audio device 20 advantageously includes a plurality of RF filters to reduce the sensitivity of the device to such close-proximity RF interference from the EM energy emanating from the mobile wireless communications device 22.

The portable audio device 20 illustratively includes a portable housing 23, a battery 24 carried by the portable housing, a recharging power input 25 connected to the battery, a digital signal input 26, and an audio analog signal output 27. The digital signal input 27 may be a universal serial bus (USB) 2.0 input, for example, which allows the portable audio device to be connected to a personal computer (PC) to download digital audio files (e.g., digital stereo files, MP3 files, etc.) to be stored in a memory 30. The recharging power input 25 may be connected to a DC power adapter, for example. In some embodiments, the recharging power input 25 may be connected to the voltage line of the USB port so that the device 20 is charged when connected to a PC or other USB host, for example. The audio analog signal output may be a headphone output and/or stereo line outs for connection to a separate audio system, etc., for example. Of course, other suitable inputs/outputs may be used in some embodiments, as will be appreciated by those skilled in the art.

The portable audio device 20 also illustratively includes a digital-to-analog converter (DAC) 31 carried by the portable housing 23 and powered by the battery 24 for converting a selected digital audio file from the memory 30 into an analog audio signal, as will be appreciated by those skilled in the art. Moreover, one or more audio analog amplifiers 32 is illustratively connected between the DAC 31 and the audio analog signal output 27. The audio analog amplifier(s) 32 amplifies the analog output signals to the appropriate level for a headphone or stereo line out, for example, as will be appreciated by those skilled in the art.

At least one first RF filter 33 is illustratively connected to the recharging power input 25 for reducing the RF interference over the predetermined frequency range or ranges of interest from the adjacent mobile wireless communications device 22. By way of example, the predetermined frequency range may be from about 30 MHz to 6 GHz. Additionally, at least one second RF filter 34 is illustratively connected to the audio analog signal output 27 also for reducing the RF interference over the predetermined frequency range from the adjacent mobile wireless communications device 22. The recharging power input 25 and audio analog signal output 27 are particularly susceptible to the RF interference. Yet, by matching the RF filters 33, 34 to a predetermined frequency range or ranges typically associated with a cellular or other wireless communications device (e.g., personal area network (PAN), MAN device, etc.) that may be in close proximity to the portable audio device 20, the overall sensitivity of the device may be significantly reduced to provide an improved user experience.

Figure 2:
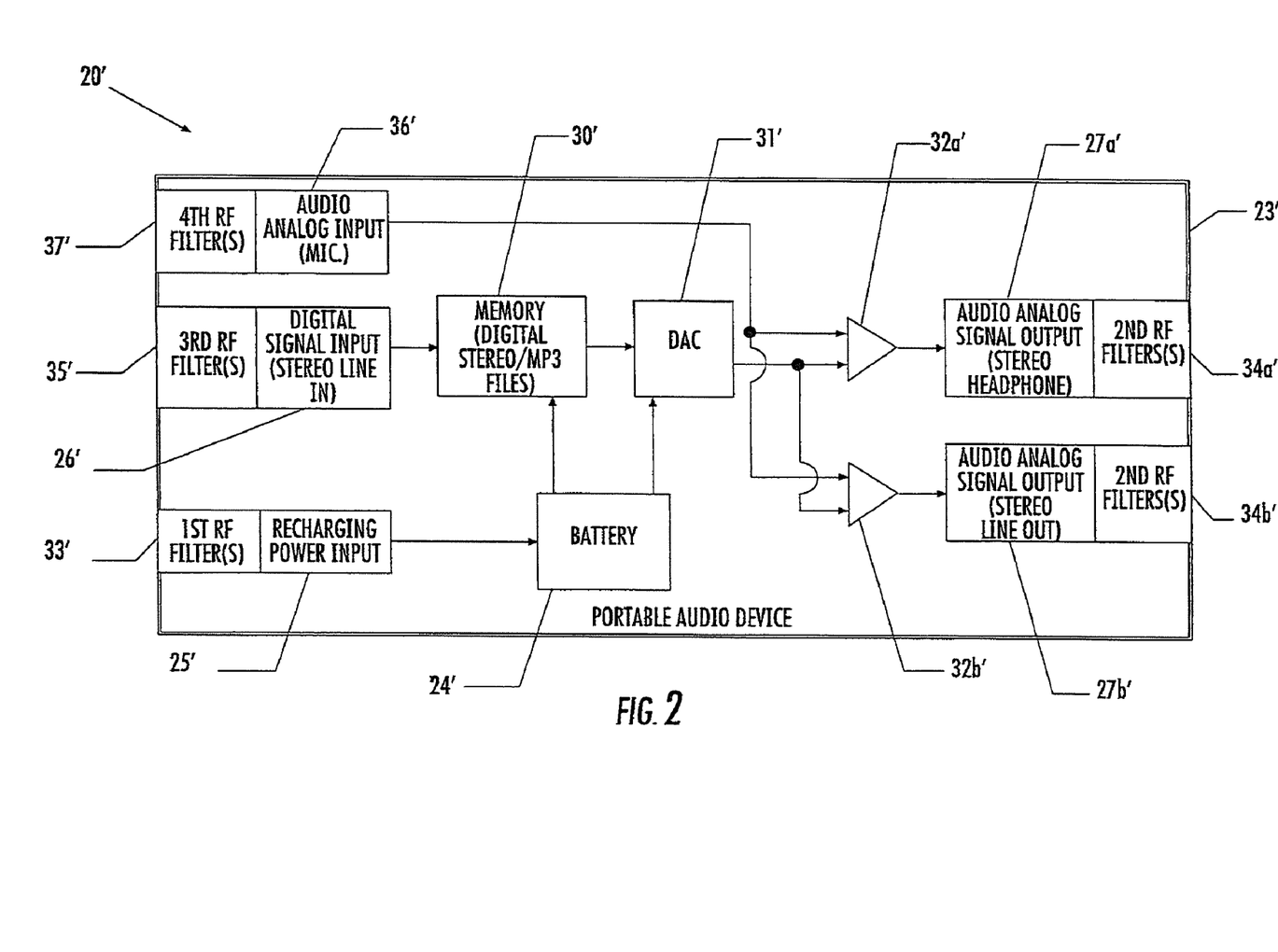
FIG. 2 is a schematic block diagram of an alternate embodiment of the portable audio device of FIG. 1.

Turning now additionally to FIG. 2, further aspects are now described with reference to a portable audio device 20' which illustratively includes at least one third RF filter 35' connected to the digital signal input 26' also for reducing RF interference over the predetermined frequency range from the adjacent mobile wireless communications device 22. In the illustrated embodiment, the digital signal input 26' has stereo line inputs. Furthermore, the audio analog signal output comprises a stereo headphone output 27a' and stereo line output 27b', each of which has a respective filter element 34a', 34b' and audio analog amplifiers 32a', 32b'.

The portable audio device 20' also illustratively includes an audio analog input 36', such as a microphone input, connected to the audio analog amplifiers 32a', 32b'. At least one fourth RF filter 37' is further connected to the audio analog signal input 36' again for reducing RF interference over the predetermined frequency range from the adjacent mobile wireless communications device 22.

Figure 3:
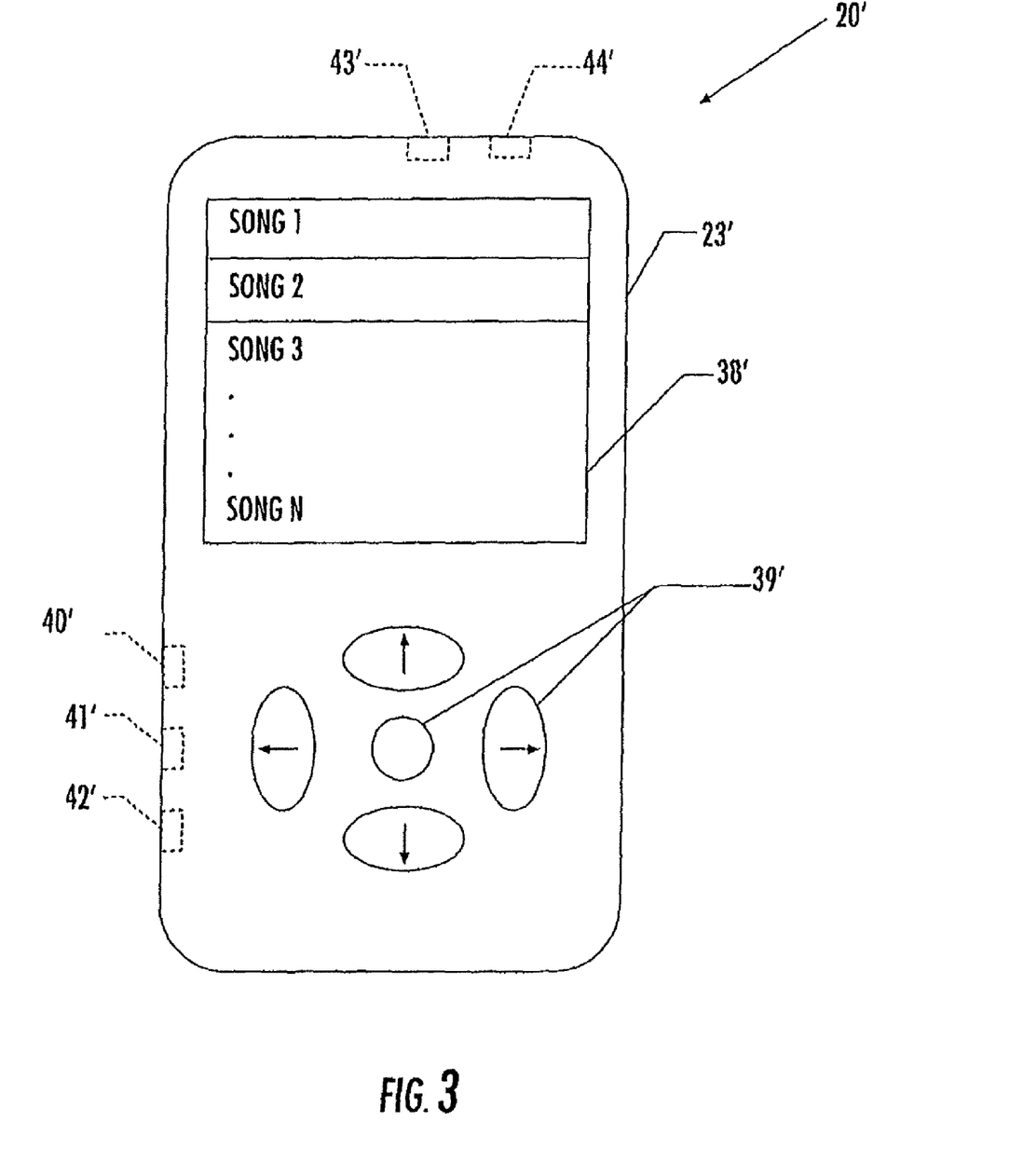
FIG. 3 is front view of the portable audio device of FIG. 2 illustrating a display and user input device thereof.
Figure 4:
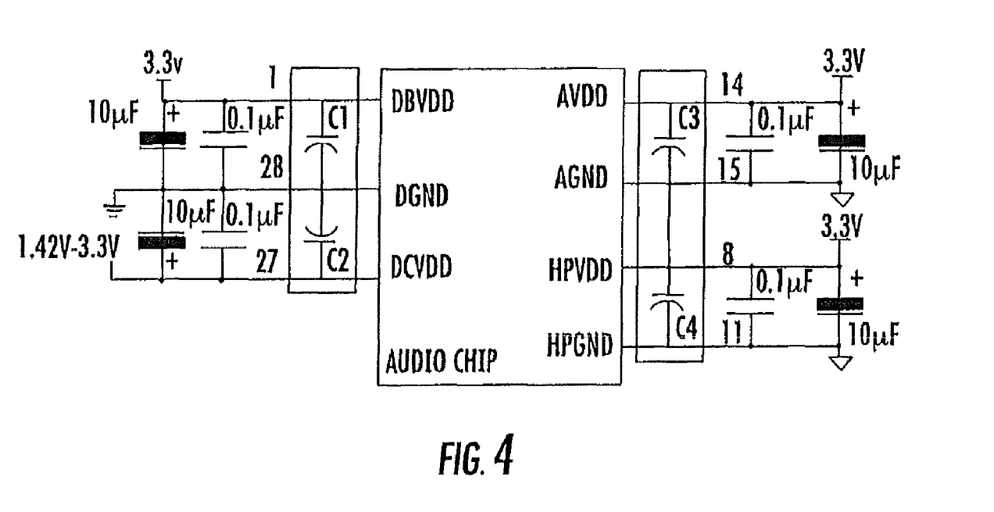
FIG. 4 is a schematic diagram of the recharging power input circuit and associated first RF filter elements of FIG. 2.

Referring additionally to FIG. 3, the portable audio device 20' further illustratively includes a display 38' carried by the portable housing 23', and a user input device (i.e., buttons 39') also carried by the portable housing. A controller or processor (not shown) may cooperate with the buttons 39' and the display 38' to allow a user to select digital audio files (e.g., songs, etc.) to be converted to audio signals (i.e., played) from a menu on the display, as will be appreciated by those skilled in the art. In the illustrated example, "Song 2" is selected from among the listed songs. Of course, other types of user input devices may be used instead of or in addition to the buttons 39', such as a touch screen, scroll wheels, track balls, etc., as will also be appreciated by those skilled in the art. Moreover, it should be noted that the portable audio device 20' may also be used for displaying digital images and/or video, as will also be appreciated by those skilled in the art.

The portable audio device 20' also illustratively includes respective connectors/plugs 40'-44' for the recharging power input 25', digital signal input 26', audio analog input 36', and audio signal outputs 27a', 27b', as will be appreciated by those skilled in the art. Other features and components common to portable audio devices such as MP3 players and portable radios which are well known to those of skill in the art may also be included.

Turning now to FIGS. 4-8, particular examples of the above-noted RF filters are now described. The recharging power input circuit 25' includes digital voltage inputs DBVDD and DCVDD connected to the appropriate power supplies (e.g., 1.42 or 3.3V), a digital ground input DGND, an analog voltage input AVDD connected to a 3.3V source, an analog ground AGND, and an additional voltage input HPVDD connected to a 3.3V source and associated ground HPGND. The first RF filter 33' illustratively includes a capacitor C1 connected between the digital voltage input DBVDD and digital ground DGND (i.e., connected in parallel with DBVDD), a capacitor C2 connected between the digital voltage input DCVDD and digital ground DGND, a capacitor C3 connected between the analog voltage input AVDD and analog ground AGND, and a capacitor C4 connected between the additional voltage input HPVDD and associated ground HPGND. Furthermore, capacitors C5, C6 are connected in parallel with the capacitor C1, capacitors C7, CB are connected in parallel with the capacitor C2, capacitors C9, C10 are connected in parallel with the capacitor C3, and capacitors C11, C12 are connected in parallel with the capacitor C4.

Figure 5:
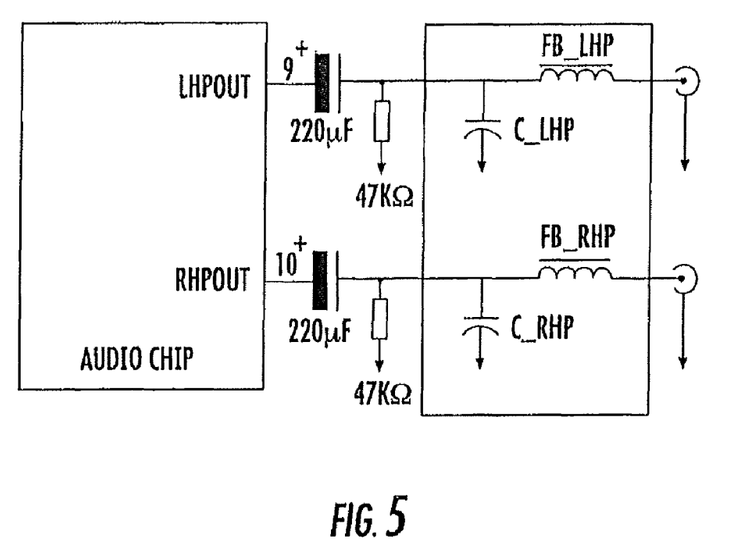
FIG. 5 is schematic diagram of the stereo headphone audio analog signal output circuit and associated second RF filter elements of FIG. 2.

The stereo headphone output circuit 27a' illustratively includes a left headphone output LHPOUT and a right headphone output RHPOUT. The left headphone output LHPOUT has a series connected capacitor C20 and a parallel connected resistor R1 connected thereto, and the right headphone output similarly has a series connected capacitor C21 and a parallel connected resistor R2 connected thereto, as shown in FIG. 5. Moreover, the second RF filter 34a' illustratively includes a series connected inductor L1 and a parallel connected capacitor C22 connected to the left headphone output LHPOUT, and a series connected inductor L2 and a parallel connected capacitor C23 connected to the right headphone output RHPOUT as shown.

Figure 6:
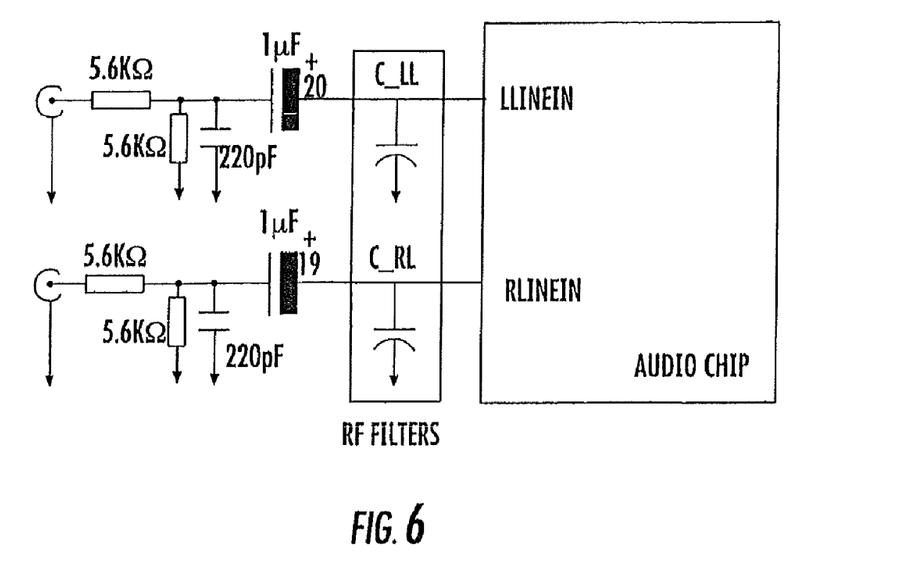
FIG. 6 is a schematic block diagram of the line input digital signal inputs and associated third RF filter elements of FIG. 2.

The stereo line input circuit 26' illustratively includes a left line input LLINEIN and a right line input RLINEIN. A resistor R3 and capacitor C31 are connected in series with the left line input LLINEIN, and a resistor R4 capacitor C30 are also connected in parallel with the left line input. Similarly, a resistor R5 and capacitor C33 are connected in series with the right line input RLINEIN, and a resistor R6 and capacitor C32 are also connected in parallel with the right line input as shown in FIG. 6. The third RF filter 35' illustratively includes a capacitor C34 parallel connected to the left line input LLINEIN, and a capacitor C35 parallel connected to the right line input RLINEIN.

Figure 7:
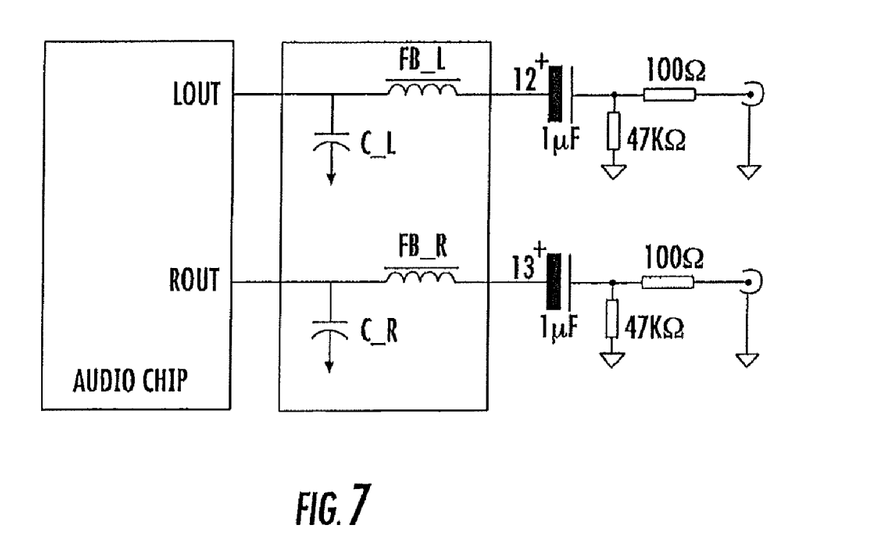
FIG. 7 is a schematic diagram of the line out audio analog signal output circuit and associated second RF filter elements of FIG. 2.

The stereo line output circuit 27b' illustratively includes a left line output LOUT and a right line output ROUT (FIG. 7). A capacitor C40 and resistor R10 are series connected to the left line output LOUT, and a resistor R11 is also parallel connected to the left line output. Moreover, a capacitor C41 and resistor R12 are series connected to the right line output ROUT, and a resistor R13 is parallel connected to the right line output. The RF filter 34b' illustratively includes an inductor L10 series connected and a capacitor C42 parallel connected to the left line output LOUT. The RF filter 34b' further illustratively includes an inductor L11 series connected and a capacitor C43 parallel connected to the right line output ROUT.

Figure 8:
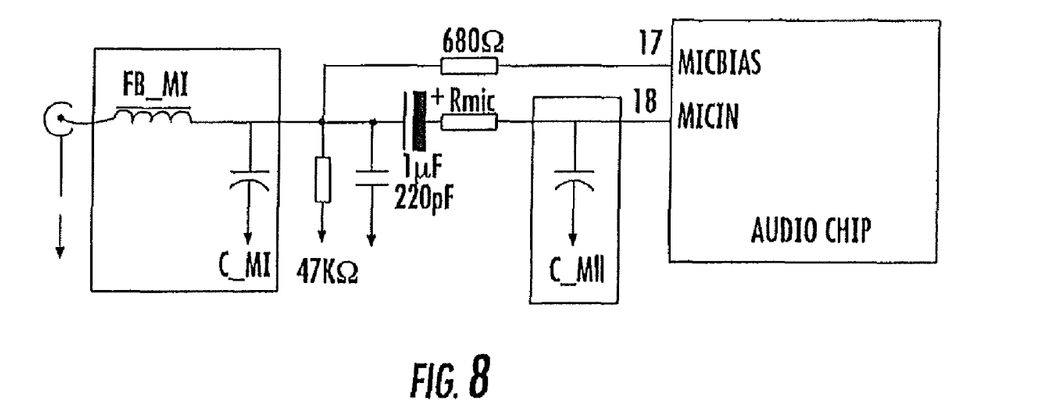
FIG. 8 is a schematic block diagram of the microphone audio analog input circuit and associated fourth filter elements of FIG. 2.

In addition, the microphone input circuit 36' illustratively includes a microphone input MICIN and a microphone bias input MICBIAS, as shown in FIG. 8. A capacitor C50 and resistor Rmic are series connected to the microphone input MICIN, and a resistor R14 and capacitor C51 are also parallel connected to the microphone input. Furthermore, a resistor R15 is series connected to the microphone bias input MICBIAS. The fourth RF filter 37' illustratively includes capacitors C52 and C53 parallel connected to the microphone input MICIN, as well as a series connected inductor L12 as shown.

It will be appreciated that the above noted the selection of the above-noted filter components will be based upon the given frequency band of interest, and the additional circuit components connected to the various inputs/outputs in a given embodiment. Moreover, it will also be appreciated by those skilled in the art that various circuits such as the recharging power input circuit 25', stereo headphone output circuit 27a', stereo line input circuit 26', stereo line output circuit 27b', and microphone input circuit 36' may be implemented with an audio coder/decoder (codec) chip, for example. Moreover, various components discussed above may be implemented using a combination of hardware and software modules, as will also be appreciated by those skilled in the art.

A related method aspect is for reducing sensitivity of a portable audio device 20 to RF interference over a predetermined frequency range from an adjacent mobile wireless communications device 22. The method may include connecting at least one first RF filter 33 to the recharging power input 25 for reducing RF interference over the predetermined frequency range from the adjacent mobile wireless communications device 22. The method may further include connecting at least one second RF filter 34a' to the audio analog signal output 27a' also for reducing RF interference over the predetermined frequency range from the adjacent mobile wireless communications device 22, as discussed further above. Additional method aspects will be appreciated from the foregoing description and need not be discussed further herein.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic device comprising: a rechargeable battery; a recharging power input coupled to said rechargeable battery; a signal input; a memory coupled to said signal input and configured to store audio files; an audio signal output; audio circuitry coupled to said audio signal output and said memory, and configured to be powered by said rechargeable battery and playback the audio files; at least one first RF filter coupled to said recharging power input; and at least one second RF filter coupled to said audio signal output.

2. The electronic device of claim 1 further comprising at least one third RF filter coupled to said signal input.

3. The electronic device of claim 2 wherein said at least one third RF filter comprises a parallel coupled capacitor.

4. The electronic device of claim 1 further comprising:
an audio input coupled to said audio circuitry; and
at least one fourth RF filter coupled to said audio input.

5. The electronic device of claim 4 wherein said at least one fourth RF filter comprises a series coupled inductor and a parallel coupled capacitor.

6. The electronic device of claim 1 wherein said at least one first RF filter comprises a parallel coupled capacitor.

7. The electronic device of claim 1 wherein said at least one second RF filter comprises a series coupled inductor and parallel coupled capacitor.

8. The electronic device of claim 1 wherein said at least one first and second filters each filters frequencies in a frequency range of from about 30MHz to 6GHz.

9. The electronic device of claim 1 wherein the stored audio files comprise digital stereo audio files.

10. The electronic device of claim 1 further comprising at least one display coupled to said audio circuitry; and at least one user input device coupled to said audio circuitry.

11. An electronic device comprising: a rechargeable battery; a recharging power input coupled to said rechargeable battery; an audio signal output; a memory configured to store stereo audio files; audio circuitry coupled to said audio signal output and said memory, and configured to be powered by said rechargeable battery and playback the stereo audio files; at least one first RF filter coupled to said recharging power input; at least one second RF filter coupled to said audio signal output; a signal input coupled to said audio circuitry; and at least one third RF filter coupled to said signal input.

12. The electronic device of claim 11 wherein said at least one third RF filter comprises a parallel coupled capacitor.

13. The electronic device of claim 11 further comprising:
an audio input coupled to said audio circuitry; and
at least one fourth RF filter coupled to said audio input.

14. The electronic device of claim 13 wherein said at least one fourth RF filter comprises a series coupled inductor and a parallel coupled capacitor.

15. The electronic device of claim 11 wherein said at least one first RF filter comprises a parallel coupled capacitor.

16. The electronic device of claim 11 wherein said at least one second RF filter comprises a series coupled inductor and parallel coupled capacitor.

17. The electronic device of claim 11 wherein said at least one first, second and third filters each filters frequencies in a frequency range of from about 30MHz to 6GHz.

18. A method for making an electronic device comprising: coupling a rechargeable battery to a recharging power input; coupling a signal input to a memory configured to store audio files; coupling an audio signal output to audio circuitry; coupling the audio circuitry to the memory, the audio circuitry configured to be powered by the rechargeable battery to playback the audio files; coupling at least one first RF filter to the recharging power input; and coupling at least one second RF filter to the audio signal output.

19. The method of claim 18 further comprising : coupling at least one third RF filter to the signal input.

20. The method of claim 18 further comprising:
coupling an audio input to the audio circuitry; and
coupling at least one fourth RF filter to the audio input.

* * * * *